(12) United States Patent
Tomita

(10) Patent No.: US 11,764,649 B2
(45) Date of Patent: Sep. 19, 2023

(54) ROTATION DETECTION APPARATUS

(71) Applicant: Proterial, Ltd., Tokyo (JP)

(72) Inventor: Kazuhiko Tomita, Tokyo (JP)

(73) Assignee: Proterial, Ltd., Tokyo (JP)

( * ) Notice: Subject to any disclaimer, the term of this patent is extended or adjusted under 35 U.S.C. 154(b) by 178 days.

(21) Appl. No.: 17/408,867

(22) Filed: Aug. 23, 2021

(65) Prior Publication Data

US 2022/0065659 A1 Mar. 3, 2022

(30) Foreign Application Priority Data

Aug. 31, 2020 (JP) ................................ 2020-145315

(51) Int. Cl.
*H02K 11/215* (2016.01)
*G01D 5/14* (2006.01)
*G01B 7/30* (2006.01)

(52) U.S. Cl.
CPC ............. *H02K 11/215* (2016.01); *G01D 5/14* (2013.01); *G01B 7/30* (2013.01)

(58) Field of Classification Search
CPC ...... G01D 5/14; G01D 5/2451; G01D 11/245; G01D 5/147; H02K 11/215; G01B 7/30; G01P 3/488
See application file for complete search history.

(56) References Cited

U.S. PATENT DOCUMENTS

| | | | | |
|---|---|---|---|---|
| 4,229,696 A | * | 10/1980 | Gustafson | G01D 5/147 324/228 |
| 5,196,794 A | * | 3/1993 | Murata | H03K 17/9517 324/207.2 |
| 2015/0198430 A1 | | 7/2015 | Imai et al. | |

FOREIGN PATENT DOCUMENTS

| | | | | |
|---|---|---|---|---|
| DE | 4141959 A1 | * | 6/1993 | ............. G01D 5/147 |
| DE | 102019122046 A1 | * | 2/2021 | ............. G01B 7/003 |
| EP | 0671600 A2 | * | 9/1995 | |
| EP | 1975637 A2 | * | 10/2008 | ............. G01R 33/12 |
| JP | H0538567 U | * | 5/1993 | |
| JP | H0559315 U | * | 8/1993 | |
| JP | H07134140 A | * | 5/1995 | |
| JP | 2536852 Y2 | * | 5/1997 | |
| JP | 2000097605 A | * | 4/2000 | |
| JP | 2008249370 A | * | 10/2008 | ............. G01R 33/12 |
| JP | 2015133377 A | | 7/2015 | |
| JP | 2016133406 A | * | 7/2016 | ............... G01D 5/14 |
| SE | 449662 B | * | 5/1987 | ........... F15B 15/2846 |
| WO | WO-9312403 A1 | * | 6/1993 | ............. G01D 5/147 |
| WO | WO-9634449 A1 | * | 10/1996 | ........... H02K 11/215 |
| WO | WO-0052425 A1 | * | 9/2000 | ............... G01B 7/30 |

* cited by examiner

*Primary Examiner* — Mohamad A Musleh
(74) *Attorney, Agent, or Firm* — McCormick, Paulding & Huber PLLC

(57) ABSTRACT

The present invention relates to a rotation detection apparatus configured to detect a rotation state of a gear based on a magnetic field change that occurs as the gear is rotated. The rotation detection apparatus includes: a first sensor portion and a second sensor portion each having a magnetic detection element and a covering member configured to cover the magnetic detection element; one permanent magnet arranged between the first sensor portion and the second sensor portion; and a housing portion configured to accommodate the first sensor portion, the second sensor portion and the permanent magnet.

3 Claims, 5 Drawing Sheets

ROTATION DETECTION APPARATUS

CROSS-REFERENCE TO RELATED APPLICATION

The present application claims priority from Japanese Patent Application No. 2020-145315 filed on Aug. 31, 2020, the content of which is hereby incorporated by reference into this application.

TECHNICAL FIELD OF THE INVENTION

The present invention relates to a rotation detection apparatus configured to detect a rotation state of an object-to-be-detected based on a magnetic field change that occurs as the object-to-be-detected is rotated.

BACKGROUND OF THE INVENTION

An example of a rotation detection apparatus as described above is disclosed in Japanese Patent Application Laid-Open Publication No. 2015-133377 (Patent Document 1). The rotation detection apparatus disclosed in Patent Document 1 comprises a detection portion having a built-in magnetic detection element (MR element) and a built-in magnet. The detection portion is arranged so as to face an object-to-be-detected (gear made of a magnetic body). Specifically, the detection portion is arranged such that the magnet is located at an opposite side of the gear with the MR element sandwiched therebetween. As a result, when the gear is rotated, a convex portion and a concave portion provided on the gear alternately face the MR element. At this time, when the convex portion of the gear is close to the MR element, a magnetic flux emitted from the magnet located behind the MR element is concentrated on the convex portion. Therefore, a spread of the magnetic flux becomes small. On the other hand, when the concave portion of the gear is close to the MR element, the magnetic flux emitted from the magnet located behind the MR element is concentrated on the convex portions adjacent to the concave portion. Therefore, the spread of the magnetic flux becomes large. In response to such a magnetic flux change, a magnetization direction of a free magnetization layer in the MR element changes, and a resistance of the MR element changes. The rotation detection apparatus disclosed in Patent Document 1 is configured to detect a rotation angle and a rotation speed of the gear by using the resistance change of the MR element that occurs in the above-described manner.

SUMMARY OF THE INVENTION

The rotation detection apparatus as described above is used as, for example, a wheel speed sensor constituting an ABS device (anti-lock braking device) installed in a vehicle such as an automobile or a motorcycle. With the development of automated driving systems, driver-assistance systems and the like in recent years, there has been a need to further improve safety and reliability of the ABS device. More specifically, there is a need for redundancy in the ABS device. Specifically, there is a need to increase the number of wheel speed sensors constituting the ABS device to two or more. When two or more wheel speed sensors are provided, even if one wheel speed sensor fails, the other wheel speed sensor(s) can continue to detect wheel rotation.

Here, in order to achieve redundancy in the ABS device by using the rotation detection apparatus disclosed in Patent Document 1, it is necessary to increase the number of magnets or increase the size of the magnet. In the rotation detection apparatus disclosed in Patent Document 1, the magnet is arranged behind the MR element. Therefore, in a case where a plurality of MR elements are provided, it is necessary to individually arrange a magnet behind each of the MR elements, or arrange a large magnet spanning behind these plurality of MR elements. However, the addition or enlargement of magnets may cause an increase in size and cost of the rotation detection apparatus.

An object of the present invention is to make it possible to achieve redundancy in the rotation detection apparatus without increasing the size and cost.

The rotation detection apparatus of the present invention is configured to detect a rotation state of an object-to-be-detected based on a magnetic field change that occurs as the object-to-be-detected is rotated. The rotation detection apparatus of the present invention comprises: a first sensor portion and a second sensor portion each having a magnetic detection element and a covering member configured to cover the magnetic detection element; one permanent magnet arranged between the first sensor portion and the second sensor portion; and a housing portion configured to accommodate the first sensor portion, the second sensor portion and the permanent magnet.

In one aspect of the present invention, the housing portion is a resin molded body collectively enclosing the first sensor portion, the second sensor portion and the permanent magnet.

In another aspect of the present invention, the first sensor portion faces a first main surface of the permanent magnet via a gap, and the second sensor portion faces a second main surface of the permanent magnet via a gap, the second main surface having a polarity opposite to that of the first main surface. A spacing (D1) between the first sensor portion and the first main surface of the permanent magnet differs from a spacing (D2) between the second sensor portion and the second main surface of the permanent magnet.

In another aspect of the present invention, the covering member in each of the first sensor portion and the second sensor portion has an upper surface and a lower surface opposite to each other with the magnetic detection element sandwiched therebetween. The magnetic detection element in each of the first sensor portion and the second sensor portion is embedded at a position closer to the upper surface than the lower surface in a direction in which the upper surface and the lower surface of the covering member are opposite to each other. The first sensor portion is arranged such that the lower surface of the covering member faces the first main surface of the permanent magnet, and the second sensor portion is arranged such that the upper surface of the covering member faces the second main surface of the permanent magnet. The spacing (D2) is greater than the spacing (D1).

In another aspect of the present invention, the first sensor portion abuts on the first main surface of the permanent magnet, and the second sensor portion abuts on the second main surface of the permanent magnet, the second main surface having a polarity opposite to that of the first main surface.

According to the present invention, redundancy in the rotation detection apparatus can be achieved without increasing the size and cost of the rotation detection apparatus.

BRIEF DESCRIPTIONS OF THE DRAWINGS

DESCRIPTION OF PREFERRED EMBODIMENTS

Hereinafter, a rotation detection apparatus according to one embodiment will be described in detail with reference to the drawings. Application of the rotation detection apparatus according to the present embodiment is not particularly limited, but is suitable for use as a wheel speed sensor constituting an ABS device (anti-lock braking device) or a traction control device installed in a vehicle such as an automobile.

Figure 1A:
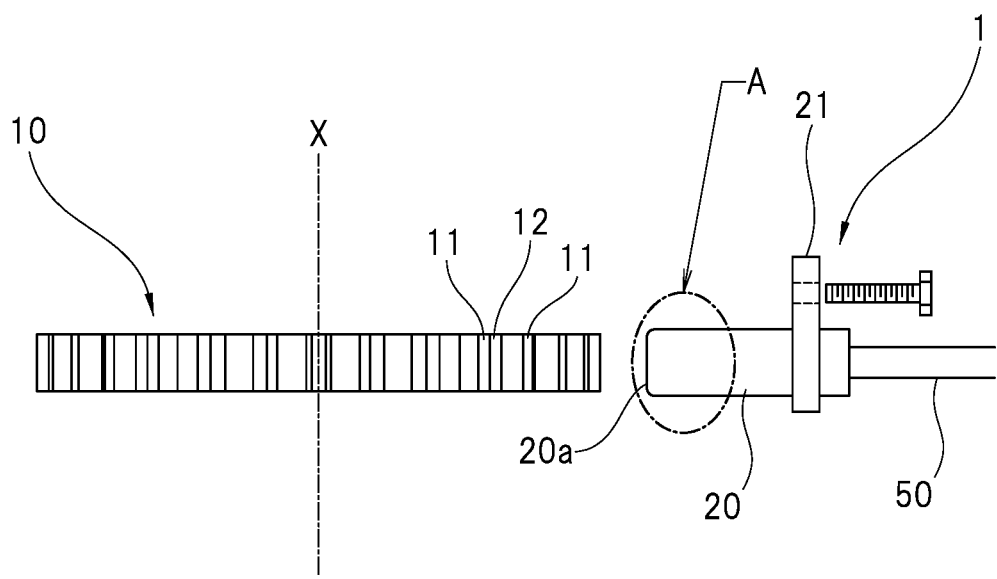
FIG. 1A is a plan view showing an example of a rotation detection apparatus in use.
Figure 1B:
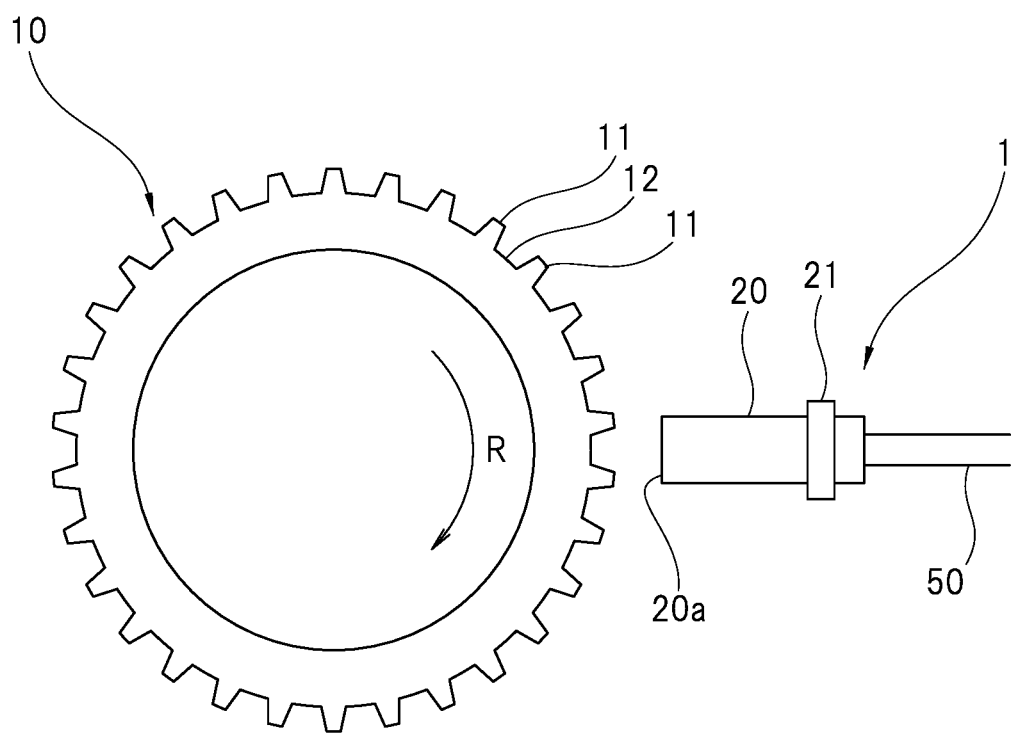
FIG. 1B is a front view showing an example of the rotation detection apparatus in use.

As shown in FIGS. 1A and 1B, a rotation detection apparatus 1 according to the present embodiment is arranged in a vicinity of a gear 10 that is rotated together with a wheel, and is configured to detect a rotation state of the gear 10 based on a magnetic field change that occurs as the gear 10 is rotated. In other words, the gear 10 corresponds to an object-to-be-detected in the present invention.

The gear 10 as the object-to-be-detected is formed into a disk shape by a magnetic material. In addition, a convex portion 11 and a concave portion 12 are alternately formed on a peripheral edge portion of the gear 10 at regular intervals along a circumferential direction. The gear 10 is rotated around a rotation axis X (FIG. 1A) as a wheel (not shown) rotates. Therefore, a rotation state (presence/absence of rotation, rotation speed, rotation angle, etc.) of the wheel can be detected by detecting the rotation state (presence/absence of rotation, rotation speed, rotation angle, etc.) of the gear 10 by using the rotation detection apparatus 1.

The rotation detection apparatus 1 is fixed to a vehicle body (hub, knuckle, suspension, etc.) such that it is in a predetermined positional relation with respect to the gear 10 which is a magnetic body. Specifically, the rotation detection apparatus 1 is fixed to the vehicle body such that a tip surface 20a of the rotation detection apparatus 1 is facing the convex portion 11 and the concave portion 12 of the gear 10. Therefore, when the gear 10 is rotated in a direction of an arrow R shown in FIG. 1B as the wheel rotates, the convex portion 11 and the concave portion 12 provided on the gear 10 alternately pass in front of the tip surface 20a of the rotation detection apparatus 1.

Figure 2:
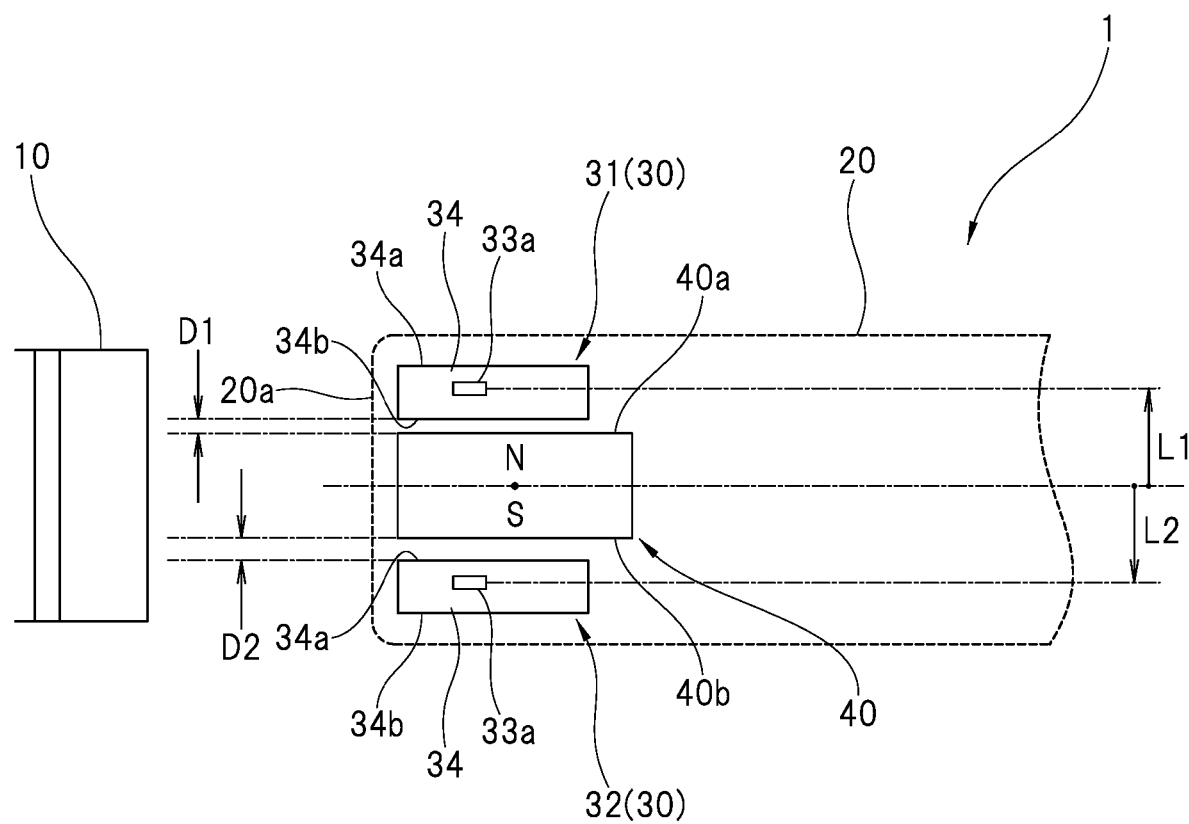
FIG. 2 is an explanatory view schematically showing an example of a structure of the rotation detection apparatus.

FIG. 2 is an explanatory view schematically showing an inner structure of a tip portion of the rotation detection apparatus 1. The tip portion of the rotation detection apparatus 1 shown in FIG. 2 roughly corresponds to a portion A surrounded by an oval with a dot-and-dash line in FIG. 1A.

As shown in FIG. 2, the rotation detection apparatus 1 has a housing portion 20 forming the tip surface 20a, two sensor portions (first sensor portion 31, second sensor portion 32) accommodated in the housing portion 20, and one permanent magnet 40. The first sensor portion 31, the second sensor portion 32 and the permanent magnet 40 are embedded in a tip of the housing portion 20. In addition, the first sensor portion 31, the second sensor portion 32 and the permanent magnet 40 are aligned in a single row parallel to the rotation axis X of the gear 10 (FIG. 1A). The permanent magnet 40 is arranged between the first sensor portion 31 and the second sensor portion 32. In other words, the first sensor portion 31 and the second sensor portion 32 face each other with the permanent magnet 40 sandwiched therebetween. That is, the permanent magnet 40 is sandwiched between the first sensor portion 31 and the second sensor portion 32. Note that, in the following description, the first sensor portion 31 and the second sensor portion 32 may be collectively referred to as "sensor portion 30".

The housing portion 20 shown in FIGS. 1A, 1B and 2 is a resin molded body made of polyamide (PA612 or PA610), and has an overall cylindrical appearance. As shown in FIG. 2, the housing portion 20 collectively encloses the sensor portion 30 and the permanent magnet 40. As shown in FIG. 1A, a flange 21 provided with a through-hole through which a fixing member (such as a bolt) for fixing the rotation detection apparatus 1 to the vehicle is integrally molded at a rear portion of the housing portion 20. For example, a portion of the housing portion 20 forward of the flange 21 is inserted into a mounting hole provided in a predetermined member-to-be-fixed such as a hub or a knuckle. At this time, a front surface of the flange 21 is placed against the member-to-be-fixed, and the bolt inserted into the through-hole of the flange 21 is coupled to a threaded hole provided in the member-to-be-fixed.

Figure 3A:
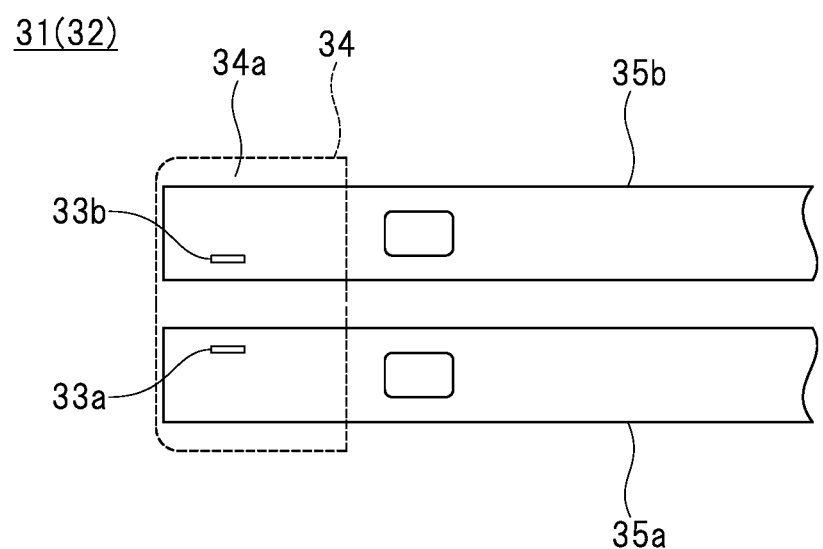
FIG. 3A is a plan view schematically showing an example of a structure of a sensor portion.
Figure 3B:
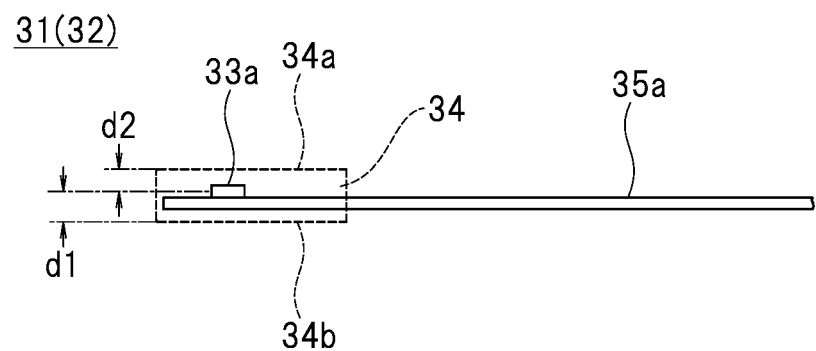
FIG. 3B is a side view schematically showing an example of the structure of the sensor portion.

The first sensor portion 31 and the second sensor portion 32 shown in FIG. 2 are both identical sensor ICs. As shown in FIGS. 3A and 3B, the first sensor portion 31 and the second sensor portion 32 each have two magnetic detection elements 33a and 33b, a covering member 34 configured to cover the magnetic detection elements 33a and 33b, a lead terminal 35a having one end connected to the magnetic detection element 33a, and a lead terminal 35b having one end connected to the magnetic detection element 33b. In other words, the magnetic detection elements 33a and 33b of each of the first sensor portion 31 and the second sensor portion 32 are embedded in the covering member 34. Note that, for reasons of convenience, the lead terminals 35a and 35b shown in FIGS. 3A and 3B are omitted from FIG. 2. In addition, a capacitor can be provided on the lead terminals 35a and 35b shown in FIGS. 3A and 3B.

The magnetic detection elements 33a and 33b in the sensor portion 30 are magnetoresistive elements (MR elements). When the convex portion 11 and the concave portion 12 of the gear 10 shown in FIGS. 1A and 1B alternately pass in front of the tip surface 20a of the rotation detection apparatus 1 including the sensor portion 30 and the permanent magnet 40, the magnetic field around the magnetic detection elements 33a and 33b in the sensor portion 30 changes, and an output of the magnetic detection elements 33a and 33b changes. In other words, the output in response to the magnetic field change that occurs as the gear 10 is rotated is obtained from the sensor portion 30. Therefore, the rotation state of the gear 10 can be detected based on the output of the sensor portion 30, and in turn, the rotation state of the wheel can be detected. Note that, as the gear 10 is rotated, a shortest distance between the gear 10 which is the magnetic body and the permanent magnet 40 changes, so that the magnetic field around the magnetic detection elements 33a and 33b changes.

As shown in FIGS. 3A and 3B, the covering member 34 of each of the first sensor portion 31 and the second sensor portion 32 has an upper surface 34a and a lower surface 34b opposite to each other with the magnetic detection elements 33a and 33b sandwiched therebetween. The magnetic detection elements 33a and 33b in each of the first sensor portion 31 and the second sensor portion 32 are embedded in a position closer to the upper surface 34a than the lower surface 34b in a direction in which the upper surface 34a and the lower surface 34b of the covering member 34 are opposite to each other. In other words, a distance (d1) from the lower surface 34b of the covering member 34 to the magnetic detection elements 33a and 33b is greater than a distance (d2) from the upper surface 34a of the covering member 34 to the magnetic detection elements 33a and 33b (d1>d2).

Referring again to FIG. 2, the permanent magnet 40 is a two-pole permanent magnet magnetized in a thickness direction, each side of the permanent magnet 40 in the thickness direction having a polarity that is opposite to the other. Specifically, one side in the thickness direction of the permanent magnet 40 including a first main surface 40a is magnetized as an N pole, and the other side in the thickness direction of the permanent magnet 40 including a second main surface 40b opposite to the first main surface 40a is magnetized as an S pole. In the following description, the first main surface 40a of the permanent magnet 40 magnetized as the N pole may be referred to as "upper surface 40a", and the second main surface 40b of the permanent magnet 40 magnetized as the S pole may be referred to as "lower surface 40b".

As shown in FIG. 2, the first sensor portion 31 faces the upper surface 40a of the permanent magnet 40 via a gap. The second sensor portion 32 faces the lower surface 40b of the permanent magnet 40 via a gap. More specifically, the lower surface 34b of the covering member 34 of the first sensor portion 31 and the upper surface 40a of the permanent magnet 40 face each other via the gap. In addition, the upper surface 34a of the covering member 34 of the second sensor portion 32 and the lower surface 40b of the permanent magnet 40 face each other via the gap.

Note that the spacing (D1) between the lower surface 34b of the covering member 34 of the first sensor portion 31 and the upper surface 40a of the permanent magnet 40 differs from the spacing (D2) between the upper surface 34a of the covering member 34 of the second sensor portion 32 and the lower surface 40b of the permanent magnet 40. Specifically, the spacing (D1) is smaller than the spacing (D2) (D1<D2). In other words, the first sensor portion 31 is closer to the permanent magnet 40 compared to the second sensor portion 32. That is, the second sensor portion 32 is arranged farther away from the permanent magnet 40 compared to the first sensor portion 31.

Next, a reason and advantage for having a position of the first sensor portion 31 intentionally different from a position of the second sensor portion 32 with respect to the permanent magnet 40 will be described.

As described above, in the first sensor portion 31 and the second sensor portion 32, the distance (d1) from the lower surface 34b of the covering member 34 to the magnetic detection elements 33a and 33b is greater than the distance (d2) from the upper surface 34a of the covering member 34 to the magnetic detection elements 33a and 33b (FIG. 3B).

Therefore, if the permanent magnet 40 is arranged in the middle of the first sensor portion 31 and the second sensor portion 32 shown in FIG. 2 (D1=D2), the magnetic detection elements 33a and 33b in the first sensor portion 31 would be farther away from a center of the permanent magnet 40 than the magnetic detection elements 33a and 33b in the second sensor portion 32. In such a case, there is a possibility that a deviation occurs between an output of the first sensor portion 31 and an output of the second sensor portion 32 for the same magnetic field change.

In the present embodiment, the spacing (D2) shown in FIG. 2 is made to be greater than the spacing (D1), so that a distance (L1) from the center of the permanent magnet 40 to the magnetic detection elements 33a and 33b in the first sensor portion 31 is identical or substantially identical to a distance (L2) from the center of the permanent magnet 40 to the magnetic detection elements 33a and 33b in the second sensor portion 32. Therefore, in the rotation detection apparatus 1 according to the present embodiment, the possibility of a deviation occurring between the output of the first sensor portion 31 and the output of the second sensor portion 32 for the same magnetic field change is reduced. In other words, in the rotation detection apparatus 1 according to the present embodiment, the output of the first sensor portion 31 and the output of the second sensor portion 32 are equalized.

Figure 4:
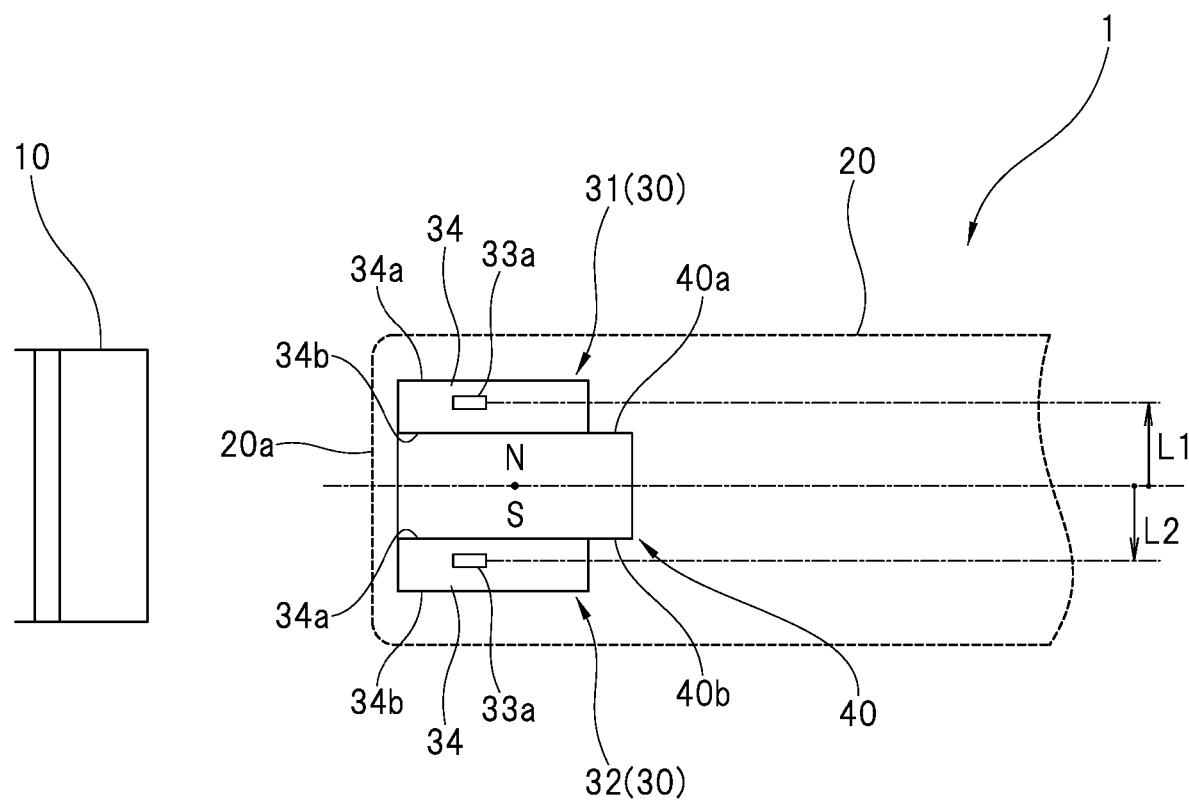
FIG. 4 is an explanatory view schematically showing another example of a structure of the rotation detection apparatus.

However, if the deviation between the output of the first sensor portion 31 and the output of the second sensor portion 32 is acceptable, or if it can be dealt with by a correction process or the like, the spacing (D1) and the spacing (D2) shown in FIG. 2 may be matched (D1=D2). For example, the first sensor portion 31 and the second sensor portion 32 may abut on the permanent magnet 40. Specifically, as shown in FIG. 4, the lower surface 34b of the covering member 34 of the first sensor portion 31 may abut on the upper surface 40a of the permanent magnet 40, and the upper surface 34a of the covering member 34 of the second sensor portion 32 may abut on the lower surface 40b of the permanent magnet 40. In such a case, the distance (L1) from the center of the permanent magnet 40 to the magnetic detection elements 33a and 33b of the first sensor portion 31 is longer than the distance (L2) from the center of the permanent magnet 40 to the magnetic detection elements 33a and 33b of the second sensor portion 32 (L1>L2).

The first sensor portion 31 and the second sensor portion 32 abut on the permanent magnet 40, so that misalignment at the time of enclosing them is prevented or suppressed. The housing portion 20 is molded by injecting molten resin into a mold in which the first sensor portion 31, the second sensor portion 32 and the permanent magnet 40 are arranged. At this time, the first sensor portion 31, the second sensor portion 32 and the permanent magnet 40 abut on one another, so that they are prevented or suppressed from moving due to injection pressure and the like. In particular, movement of the first sensor portion 31 and the second sensor portion 32 which are smaller and lighter than the permanent magnet 40 is prevented or suppressed.

Note that the outputs of the first sensor portion 31 and the second sensor portion 32 shown in FIGS. 2 and 4 are transmitted to a controller or the like of the ABS device or the traction control device via a cable 50 shown in FIGS. 1A and 1B. The cable 50 is a multi-core cable including a two-core cable connected to the lead terminals 35a and 35b of the first sensor portion 31, a two-core cable connected to the lead terminals 35a and 35b of the second sensor portion 32, and a sheath collectively covering both two-core cables.

The present invention is not limited to the foregoing embodiment, and various modifications can be made within the scope of the present invention. For example, the magnetic detection elements 33a and 33b in each of the first sensor portion 31 and the second sensor portion 32 may be a giant magnetoresistive element (GMR element), an anisotropic magnetoresistive element (AMR element) or a tunnel magnetoresistive element (TMR element), or may be other magnetoresistive elements. Further, the magnetic detection elements 33a and 33b in each of the first sensor portion 31 and the second sensor portion 32 may be a magnetic detection element other than a magnetoresistive element such as a Hall element. Note that the magnetic detection element in the first sensor portion 31 may differ from the magnetic detection element in the second sensor portion 32. For example, the magnetic detection element in the first sensor portion 31 may be an MR element while the magnetic detection element in the second sensor portion 32 is a GMR element.

The resin (mold resin) for forming the housing portion 20 is not limited to polyamide. An example of the resin for forming the housing portion 20 includes polybutylene terephthalate (PBT).

Figure 5A:
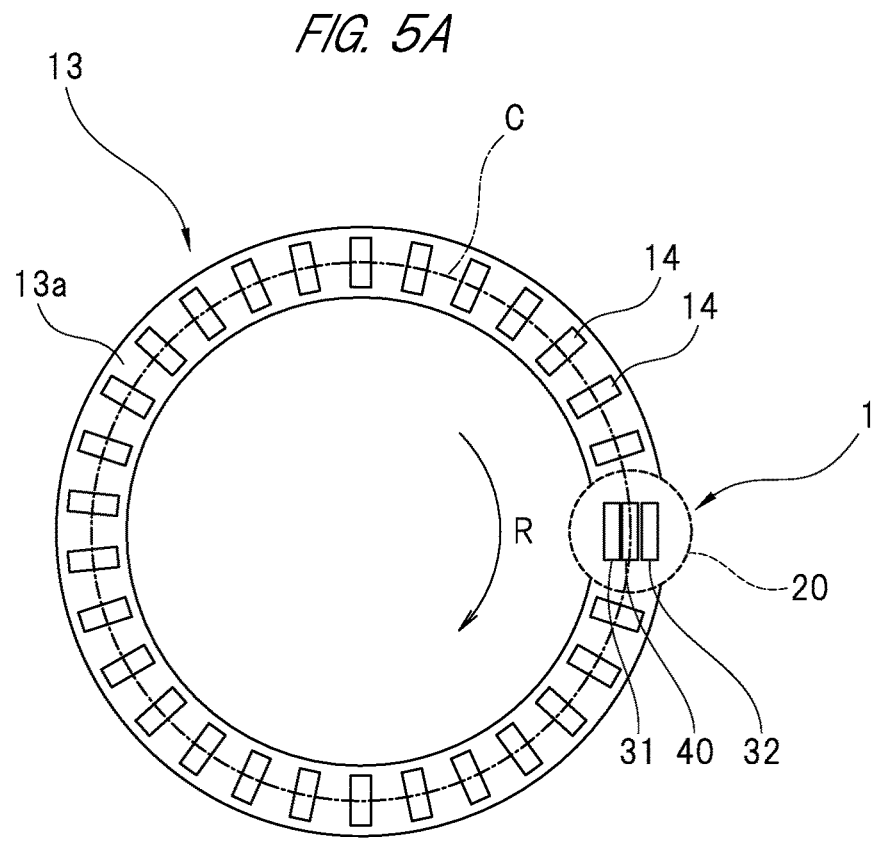
FIG. 5A is a front view showing another example of the rotation detection apparatus in use.
Figure 5B:
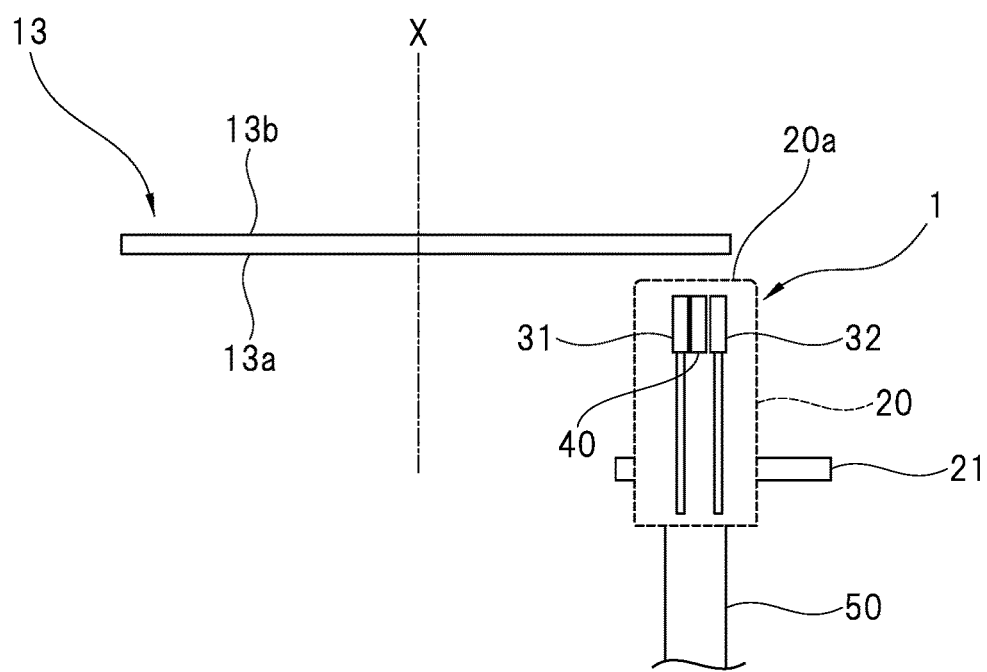
FIG. 5B is a plan view showing another example of the rotation detection apparatus in use.

The object-to-be-detected whose rotation state is detected by the rotation detection apparatus of the present invention is not limited to the gear 10 shown in FIGS. 1A and 1B. An example of the object-to-be-detected is shown in FIG. 5. A ring 13 shown in FIGS. 5A and 5B is rotated together with the wheel of the vehicle, like the gear 10 shown in FIGS. 1A and 1B.

The ring 13 is formed by a magnetic body. The ring 13 is provided with rectangular openings 14 formed at regular intervals along a circumferential direction. In a case where the object-to-be-detected is the ring 13, the rotation detection apparatus 1 is arranged in front of or behind the ring 13. In the example shown in FIGS. 5A and 5B, the rotation detection apparatus 1 is arranged in front of the ring 13, and the tip surface 20a of the rotation detection apparatus 1 faces a front surface 13a of the ring 13. Further, the rotation detection apparatus 1 is arranged such that the permanent magnet 40 is located on a circumference of a virtual circle C that passes through the middle of an inner periphery and an outer periphery of the ring 13. Note that the virtual circle C halves or substantially halves each of the openings in a longitudinal direction.

When the ring 13 is rotated in a direction of an arrow R shown in FIG. 5A as the wheel rotates, the plurality of openings 14 provided in the ring 13 successively pass in front of the tip surface 20a of the rotation detection apparatus 1. As a result, the magnetic field around the first sensor portion 31 and the second sensor portion 32 changes.

Note that, in a case where the rotation detection apparatus 1 is arranged behind the ring 13, the tip surface 20a of the rotation detection apparatus 1 faces a rear surface 13b of the ring 13. In addition, the openings 14 of the ring 13 may be replaced with convex portions protruding toward the tip surface 20a of the rotation detection apparatus 1. In such a case, the front surface 13a or the rear surface 13b of the ring 13 will have concave/convex portions that are substantially identical to concave/convex portions provided on the peripheral edge portion of the gear 10 (FIGS. 1A, 1B).

A magnetic detection element can be added between the two magnetic detection elements 33a and 33b shown in FIG. 3 to detect a rotation direction of the object-to-be-detected. Orientation of the permanent magnet 40 shown in FIGS. 2 and 4 may also be reversed. In other words, the S pole of the permanent magnet 40 may face the first sensor portion 31 while the N pole of the permanent magnet 40 faces the second sensor portion 32.

The rotation detection apparatus 1 may comprise a holder configured to hold the first sensor portion 31, the second sensor portion 32 and the permanent magnet 40, and being covered by the housing portion 20.

What is claimed is:

1. A rotation detection apparatus configured to detect a rotation state of an object-to-be-detected based on a magnetic field change that occurs as the object-to-be-detected is rotated, the rotation detection apparatus comprising:
    a first sensor portion and a second sensor portion each having a magnetic detection element and a covering member configured to cover the magnetic detection element;
    one permanent magnet arranged between the first sensor portion and the second sensor portion;
    a housing portion configured to accommodate the first sensor portion, the second sensor portion and the permanent magnet,
    wherein the first sensor portion faces a first main surface of the permanent magnet via a gap,
    the second sensor portion faces a second main surface of the permanent magnet via a gap, the second main surface having a polarity opposite to that of the first main surface,
    a spacing (D1) between the first sensor portion and the first main surface of the permanent magnet differs from a spacing (D2) between the second sensor portion and the second main surface of the permanent magnet,
    wherein the covering member in each of the first sensor portion and the second sensor portion has an upper surface and a lower surface opposite to each other with the magnetic detection element sandwiched therebetween,
    the magnetic detection element in each of the first sensor portion and the second sensor portion is embedded at a position closer to the upper surface than the lower surface in a direction in which the upper surface and the lower surface of the covering member are opposite to each other,
    the first sensor portion is arranged such that the lower surface of the covering member faces the first main surface of the permanent magnet,
    the second sensor portion is arranged such that the upper surface of the covering member faces the second main surface of the permanent magnet, and
    the spacing (D2) is greater than the spacing (D1).

2. The rotation detection apparatus according to claim 1, wherein the housing portion is a resin molded body collectively enclosing the first sensor portion, the second sensor portion and the permanent magnet.

3. The rotation detection apparatus according to claim 1, wherein the first sensor portion abuts on a first main surface of the permanent magnet, and
    the second sensor portion abuts on a second main surface of the permanent magnet, the second main surface having a polarity opposite to that of the first main surface.

* * * * *